United States Patent
Fuchs

(10) Patent No.: US 12,465,519 B2
(45) Date of Patent: Nov. 11, 2025

(54) AVOIDING VORTICES DURING PHACOEMULSIFICATION

(71) Applicant: JOHNSON & JOHNSON SURGICAL VISION, INC., Irvine, CA (US)

(72) Inventor: Amit Fuchs, Hogla (IL)

(73) Assignee: Johnson & Johnson Surgical Vision, Inc., Irvine, CA (US)

( * ) Notice: Subject to any disclaimer, the term of this patent is extended or adjusted under 35 U.S.C. 154(b) by 525 days.

(21) Appl. No.: 17/728,356

(22) Filed: Apr. 25, 2022

(65) Prior Publication Data

US 2023/0338189 A1   Oct. 26, 2023

(51) Int. Cl.
*A61F 9/007* (2006.01)

(52) U.S. Cl.
CPC .............. *A61F 9/00745* (2013.01)

(58) Field of Classification Search
CPC ........... A61F 9/00745; A61B 17/22004; A61B 2017/22011; A61B 2017/22015; A61B 2017/22017

See application file for complete search history.

(56) References Cited

U.S. PATENT DOCUMENTS

| | | | |
|---|---|---|---|
| 2,838,695 A * | 6/1958 | Thurston | G01H 1/10 318/116 |
| 4,872,346 A | 10/1989 | Kelly-Fry et al. | |
| 4,961,424 A | 10/1990 | Kubota et al. | |
| 5,162,044 A | 11/1992 | Gahn et al. | |
| 6,352,519 B1 | 3/2002 | Anis et al. | |
| 7,794,414 B2 * | 9/2010 | Rabiner | A61B 17/22012 601/2 |
| 8,303,613 B2 * | 11/2012 | Crandall | B06B 1/0611 606/171 |
| 9,216,035 B2 | 12/2015 | Urich et al. | |
| 9,517,346 B2 | 12/2016 | Lee et al. | |
| 2004/0267298 A1 | 12/2004 | Cimino | |
| 2005/0187513 A1* | 8/2005 | Rabiner | A61B 17/22012 604/22 |
| 2007/0249941 A1 | 10/2007 | Salehi et al. | |
| 2009/0099536 A1 | 4/2009 | Akahoshi | |
| 2012/0143233 A1 | 6/2012 | Sinelnikov | |

(Continued)

FOREIGN PATENT DOCUMENTS

| EP | 0910292 B1 | 7/2005 |
|---|---|---|
| JP | H0329645 A | 2/1991 |

(Continued)

OTHER PUBLICATIONS

Chen Y., et al., "Tip Trajectories of a Smart Micro-cantilever Beam: Analysis and Design," Smart Materials and Structures, 2009, vol. 18 (11), pp. 115012 (10 pages), XP020168951.

(Continued)

*Primary Examiner* — Shaun L David
*Assistant Examiner* — Rachael L Geiger

(57) ABSTRACT

A system and method for operating a medical probe, the method including driving a tip of the medical probe to cause rotation of the tip (i) in a clockwise trajectory in a plane perpendicular to a longitudinal axis during first time intervals, and (ii) in a counterclockwise trajectory in the plane during second time intervals that are interleaved with the first time intervals.

22 Claims, 4 Drawing Sheets

(56) References Cited

U.S. PATENT DOCUMENTS

| | | |
|---|---|---|
| 2013/0006266 A1 | 1/2013 | Crandall et al. |
| 2013/0253559 A1 | 9/2013 | Slipszenko et al. |
| 2014/0055932 A1 | 2/2014 | Nakamura |
| 2015/0173950 A1 | 6/2015 | Nallakrishnan |
| 2015/0257778 A1 | 9/2015 | Harrington et al. |
| 2016/0038340 A1 | 2/2016 | Raney |
| 2018/0078268 A1 | 3/2018 | Messerly et al. |
| 2019/0008680 A1* | 1/2019 | Jochinsen ............ A61F 9/00745 |
| 2020/0268398 A1 | 8/2020 | Gill et al. |
| 2020/0384502 A1 | 12/2020 | Downey et al. |
| 2021/0330493 A1 | 10/2021 | Steen et al. |
| 2021/0353461 A1 | 11/2021 | Govari et al. |
| 2021/0361481 A1 | 11/2021 | Gliner et al. |
| 2022/0105688 A1 | 4/2022 | Dippel et al. |
| 2022/0192880 A1 | 6/2022 | Gee |
| 2022/0192881 A1 | 6/2022 | Gee |
| 2023/0240889 A1 | 8/2023 | Fuchs et al. |

FOREIGN PATENT DOCUMENTS

| | | |
|---|---|---|
| JP | H11206162 A | 7/1999 |
| WO | 2010018760 A1 | 2/2010 |
| WO | 2010057059 A1 | 5/2010 |
| WO | 2015126914 A1 | 8/2015 |
| WO | 2022219464 A1 | 10/2022 |
| WO | 2023017333 A1 | 2/2023 |

OTHER PUBLICATIONS

Co-pending U.S. Appl. No. 17/231,450, filed Apr. 15, 2021, 20 pages.

U.S. Appl. No. 17/590,184, titled, "Equalizing Multi-Channel Driving Signals of Segmented Piezoelectric Crystals," filed Feb. 1, 2022.

U.S. Appl. No. 17/231,450, titled, "Compensating for Imperfect Behavior of Multi-Piezoelectric Crystal," filed Apr. 15, 2021.

* cited by examiner

AVOIDING VORTICES DURING PHACOEMULSIFICATION

FIELD OF THE DISCLOSURE

The present disclosure relates generally to piezoelectric-vibration-based medical devices, and particularly to phacoemulsification systems using multi-crystal vibration.

BACKGROUND

A cataract is a clouding and hardening of the eye's natural lens, a structure which is positioned behind the cornea, iris, and pupil. The lens is made up mostly of water and protein, and as people age these proteins change and may begin to clump together, obscuring portions of the lens. Phacoemulsification cataract surgery can be used to correct this condition. In this procedure, a surgeon makes a small incision in the sclera or cornea of the eye. Then a portion of the anterior surface of the lens capsule is removed to gain access to the cataract. The surgeon then inserts the tip of a phacoemulsification probe into the lens capsule. The tip vibrates at ultrasonic frequency to sculpt and emulsify the cataract while a pump aspirates particles and fluid from the eye through the tip. Aspirated fluids are replaced with irrigation of a balanced salt solution to maintain the anterior chamber of the eye. After removing the cataract with phacoemulsification, the softer outer lens cortex is removed with suction. An intraocular lens (IOL) is then introduced into the empty lens capsule to restore the patient's vision.

For safe, efficient phacoemulsification, it is important that the vibration of the tip of the probe be precisely controlled. Various techniques to vibrate a phacoemulsification needle of a probe in a controlled manner were proposed in the patent literature. For example, U.S. Pat. No. 9,216,035 describes a surgical instrument and method, for example, to accomplish phacoemulsification. The surgical instrument includes a handpiece that has a piezoelectric transducer, and a needle having a free distal tip and a supported end that is attached to the handpiece. A circuit drives the piezoelectric transducer to periodically longitudinally expand and longitudinally contract at a driving frequency. The application further describes a way to reduce cavitation by exciting a needle of a surgical instrument to vibrate torsionally rather than longitudinally, so that the needle tip alternately rotates clockwise and counterclockwise in relation to its longitudinal axis. Torsional vibrations do not readily propagate as waves in fluid, so that cavitation effects are substantially reduced. However, a needle tip that is vibrating purely torsionally may too easily core into the lens material without sufficient disintegration of tissue into particles, which, in turn, may too frequently lead to total occlusions in the needle. The driving frequency is therefore further selected to ring the needle with a standing wave that is characterized by longitudinal expansion and longitudinal contraction.

As another example, U.S. Patent Application Publication 2009/0099536 describes tips for phacoemulsification needles feature geometry that allows each tip to cut or emulsify bidirectionally when used torsionally, when used longitudinally or, in some cases, when used both torsionally and longitudinally.

The present disclosure will be more fully understood from the following detailed description of the examples thereof, taken together with the drawings in which:

DETAILED DESCRIPTION OF EXAMPLES

Overview

Figure 1:
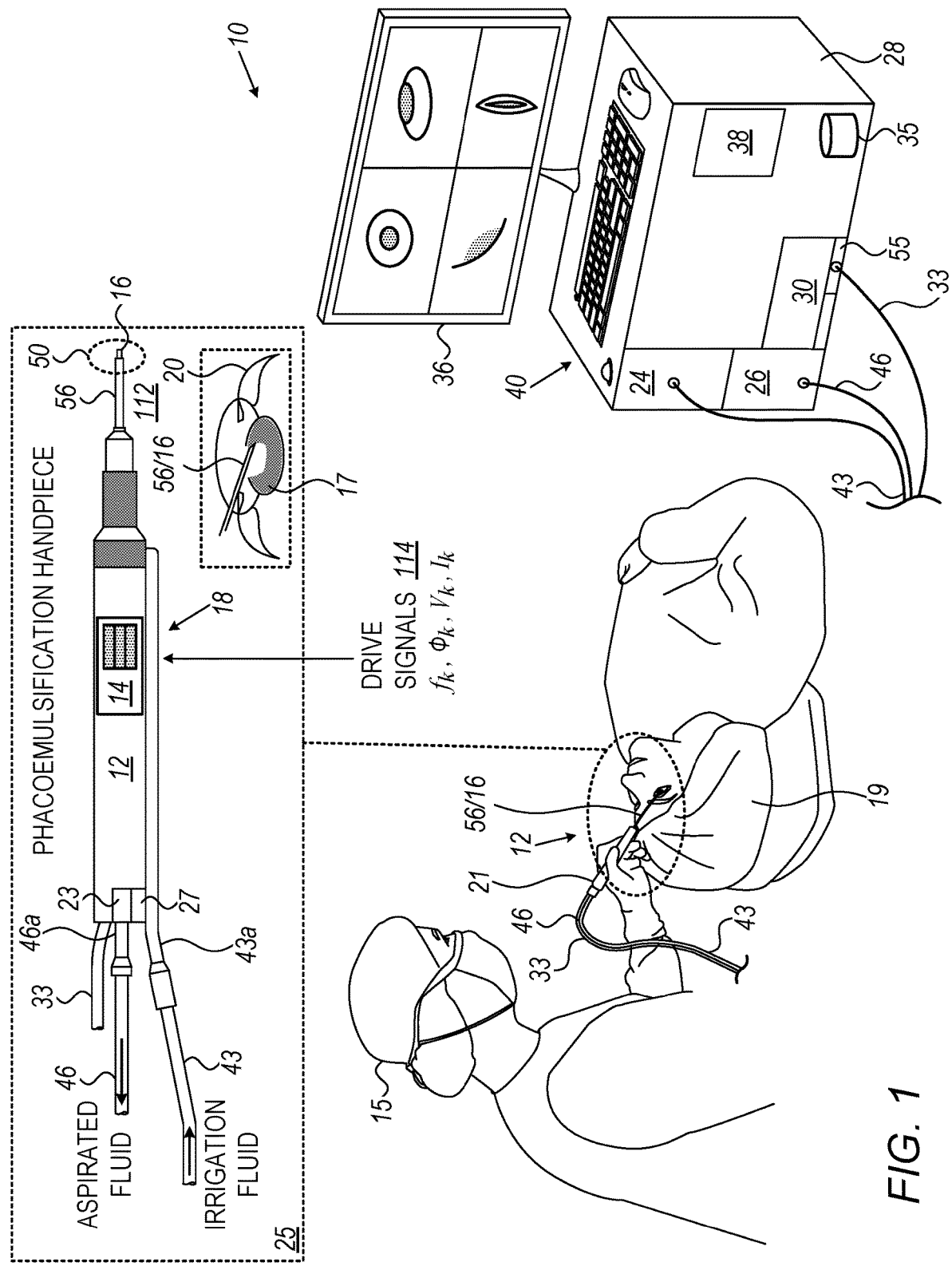
FIG. 1 is a schematic, pictorial view, along with an orthographic side view, of a phacoemulsification system, in accordance with an example of the present disclosure.

Phacoemulsification probes are commonly capable of multiple different modes of tip vibration at a resonance frequency of a piezoelectric crystal that drives the vibration, including, for example, linear, transverse, and torsional modes. The vibration imposed by ultrasound transducers on the needle of the handpiece emulsifies the lens. A commonly used vibration trajectory may be predefined with an angular component property of the aforementioned torsional mode. The angular component is achieved by a mechanical design that transforms a linear vibration into a mix of linear vibration with a limited angular motion (e.g., one induced by a mechanical asymmetry made in the needle holder or horn). Any of the above vibration modes primarily produces highly local emulsification of the lens.

A transducer capable of real 3D motion can be made, for example, from a single piezoelectric crystal which is cut into multiple parts, e.g., two, three or more parts. These parts are coupled together (e.g., cemented), and electrodes are attached to each part. In another example, a single piezoelectric crystal is metalized in portions (e.g., angular sectors) so that each portion is of as solid crystal and an electrode is attached to the metalized portion. These sorts of devices are referred to herein as a "multi-crystal." The phases and amplitudes of the drive signals that are applied to each part of the multi-crystal are chosen to generate the desired mode of motion, such as vibration and/or rotation at a resonance frequency.

In this disclosure, vibration of the needle means a back-and-forth motion of the needle along an open-ended linear (e.g., along the longitudinal axis of the needle) or curved trajectory (e.g., transverse movement), whereas rotation means unidirectional motion along a closed elliptical (e.g., circular) trajectory.

As one example, a multi-crystal can be made by three piezoelectric crystal angular segments using 120° phase differences between separate driving signals of the three angular segments. An ultrasound transducer capable of inducing rotation of a needle in this way is described in U.S. patent application Ser. No. 17/590,184, titled, "Equalizing Multi-Channel Driving Signals of Segmented Piezoelectric Crystals," filed Feb. 1, 2022, by the assignee of the present application.

As another example, the multi-crystal can be made by four piezoelectric crystal angular segments to rotate a needle in a circle about the longitudinal axis of a needle. To this end, two pairs of electrodes are energized with signals of the same frequency and voltage, but differing in phase by 90°, so that the resultant vibrations of the parts of the multi-crystal are out of phase by 90°, which generates a rotation along a circular trajectory. An ultrasound transducer capable of inducing rotation of a needle in this way is described in U.S. patent application Ser. No. 17/231,450, titled, "Compensating for Imperfect Behavior of Multi-Piezoelectric Crystal," filed Apr. 15, 2021, by the assignee of the present application.

Driving a needle to rotate unidirectionally (e.g., clockwise) along a circular trajectory may be of clinical usefulness, as the rotating needle covers a much larger lens area. For example, the circular motion can be along a circle with a diameter range of 40 to 100 microns, which can considerably shorten the time it takes to emulsify a lens at a particular given power.

However, such a rotating needle in a phacoemulsification handpiece may cause fluid vortices to form in the emulsified media that cause strong currents within the lens capsule that are undesirable for the procedure. One method to avoid vortex formation is to use very low power or a very low duty cycle of the rotational part of the motion, but since vortices form relatively quickly, even at low power, these methods are ineffective.

Examples of the present disclosure that are described herein provide a processor-controlled bidirectional rotational motion along a predefined (e.g., circular) trajectory using driving pulses with varied phase relationships among the driving signals. The periodic alteration of the rotation direction of the needle along a predefined (e.g., circular) trajectory minimizes vortices in media.

To this end, an ultrasonic driver powers the transversal signals in fast pulses (2 ms-10 ms duration in one example, with 2 ms off time) and alternates the rotation direction in every pulse to avoid forming a strong vortex. The needle may rotate 60-300 cycles (i.e., the tip may traverse the complete elliptical (e.g., circular) trajectory 60-300 times) over the duration of each pulse. The active time in the pulse is long enough to build the rotational motion on the tip (e.g., needle with an aspiration sleeve), but since the rotation direction changes very quickly, vortices do not have enough time to form. Quickly alternating the rotation direction allows the use of strong power on the transversal motion with a high duty cycle (i.e., short pause compared to duration of each pulse train) while avoiding fluid vortices.

Such a bidirectional rotation can be supplemented with a concurrent longitudinal vibration, resulting in a 3D emulsification mode which can be very efficient compared to existing emulsification modes that consist of vibration only. A method for operating a medical probe is therefore provided, the method comprising driving a tip of the medical probe to cause rotation of the tip (i) in a clockwise trajectory in a plane perpendicular to a longitudinal axis during first time intervals, and (ii) in a counterclockwise trajectory in the plane during second time intervals that are interleaved with the first time intervals. The methods may further include driving the tip to vibrate along a longitudinal axis of the probe (e.g., a longitudinal axis of the tip) concurrently with rotation of the tip.

Rotating the tip comprises performing multiple repetitions of the clockwise trajectory during each of the first time intervals, and multiple repetitions of the counterclockwise trajectory during each of the second time intervals. To this end, a processor applies harmonic signals to respective angular segments of a multi-crystal coupled with the tip of the medical probe, so as to cause the tip to rotate along the clockwise or counterclockwise trajectory. Applying the harmonic signals comprises adjusting phases of the harmonic signals so as to switch between the clockwise trajectory and the counterclockwise trajectory. The clockwise trajectory and the counterclockwise trajectory may be along a same trajectory or along dissimilar trajectories (e.g., the clockwise trajectory circular while the counterclockwise trajectory elliptical.

System Description

FIG. 1 is a schematic, pictorial view, along with an orthographic side view, of a phacoemulsification system 10, in accordance with an example of the present disclosure.

As seen in the pictorial view of phacoemulsification system 10, and in inset 25, phacoemulsification probe 12 (e.g., a handpiece 12) comprises a distal end assembly 112 comprising a needle 16 surrounded by an irrigation sleeve 56. Needle 16 is hollow, its lumen used as an aspiration channel. As seen, needle 16 can be moved in a circular trajectory 50 about the longitudinal axis of the needle.

Needle 16 is configured for insertion into a lens capsule 17 of an eye 20 of a patient 19 by a physician 15 to remove a cataract. The needle (and irrigation sleeve 56) are shown in inset 25 as a straight object. However, any suitable needle may be used with phacoemulsification probe 12, for example, a curved or bent tip needle commercially available from Johnson & Johnson Surgical Vision, Inc., Irvine, CA, USA.

As further shown, phacoemulsification probe 12 includes a multi-crystal 18 comprised in a piezoelectric actuator 14 coupled to a horn (not shown) that drives needle 16 to rotate in circular trajectory 50, that is used to break a cataract into small pieces during a phacoemulsification procedure.

Console 28 comprises a piezoelectric drive module 30, coupled, via a controller 55, with the piezoelectric multi-crystal 18 using electrical wiring running in a cable 33.

Drive module 30, which includes analog high-power filters/amplifiers/drivers (and has no control circuitry of its own in the shown example), is controlled by a processor 38 that uses the driving signals or small-amplitude monitoring signals (e.g., at detuned resonant frequencies) via cable 33 to enable a multi-frequency mechanical resonance of multi-crystal 18 to be monitored and followed using controller 55 adjusting driving signals.

Controller 55 receives commands from processor 38, or runs an algorithm using an included processor, in order to adjust driving signals from drive module 30 for each of a number of crystal segments of multi-crystal 18. When operative, typically any time during which system 10 is turned on, the processor iteratively adjusts some of the drive signals 114 (frequencies $f_k$, phases $\Phi_k$, voltages $V_k$, currents $I_k$) that drive module 30 outputs to the crystal segments, so as to rotate needle 16 in circular trajectory 50. The technique to generate such a unidirectional circular motion for a multi-crystal 18 made of three angular segments is described in the aforementioned U.S. patent application Ser. No. 17/590,184. The technique to generate unidirectional circular motion for a multi-crystal 18 made of four angular segments is described in the aforementioned U.S. patent application Ser. No. 17/231,450.

Figure 2:
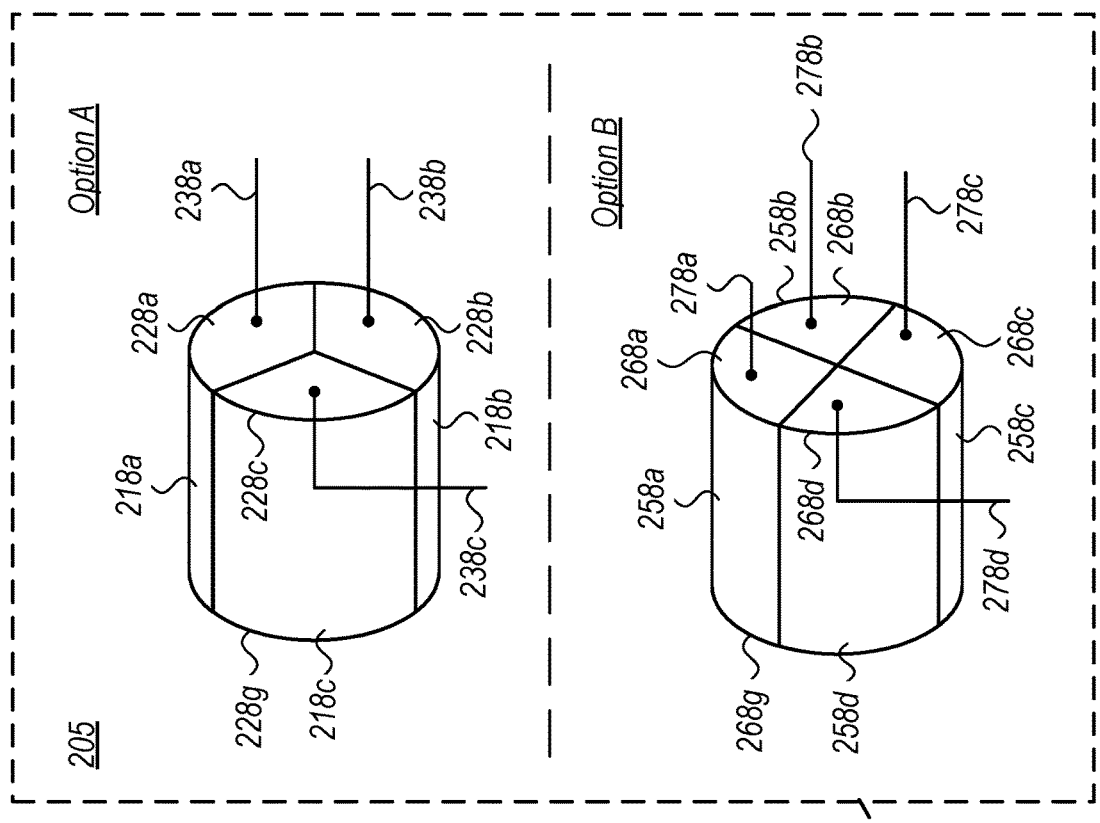
FIG. 2 is a schematic, pictorial view of the phacoemulsification handpiece of FIG. 1 with two options of a multi-crystal layout capable of inducing bidirectional needle rotation, in accordance with an example of the disclosure.
Figure 2:
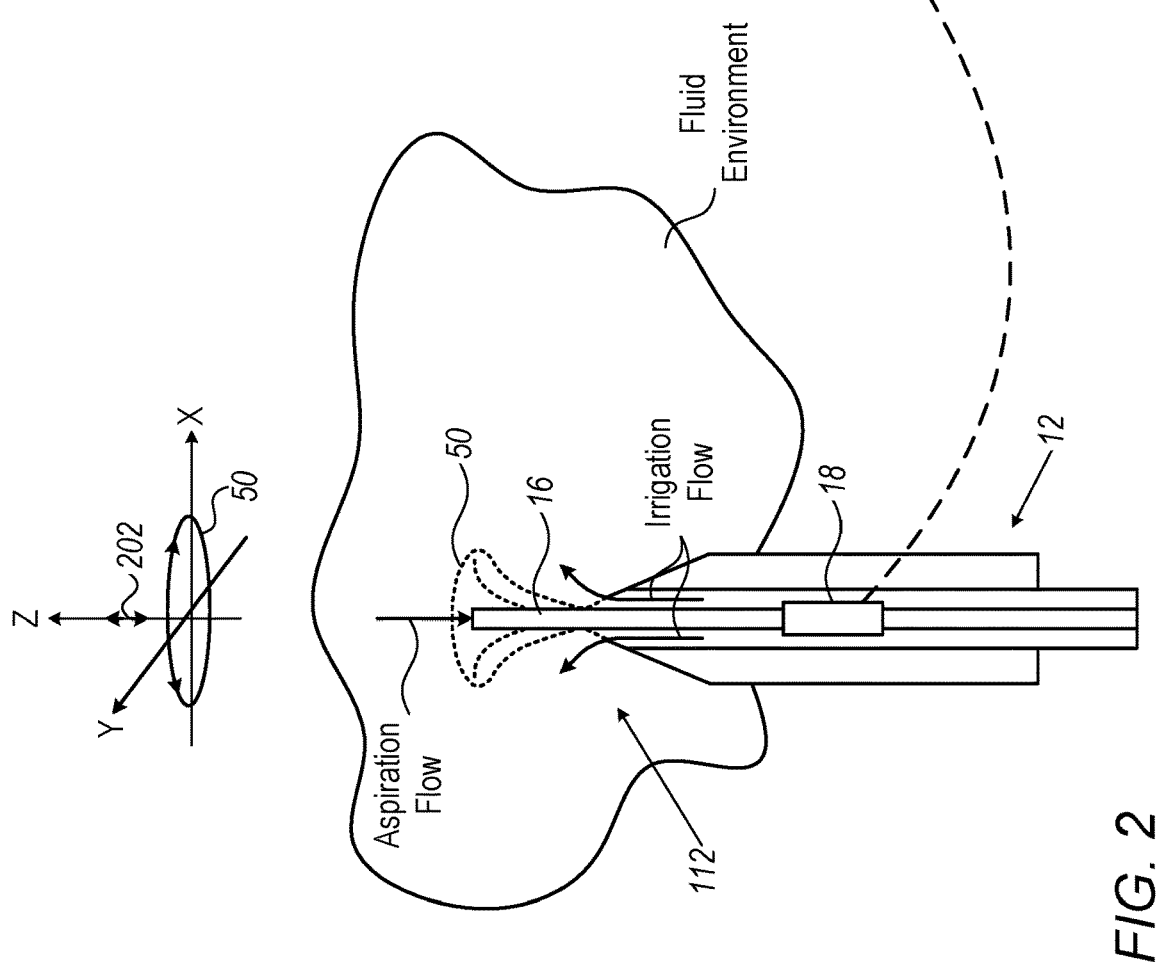
Figure 3:
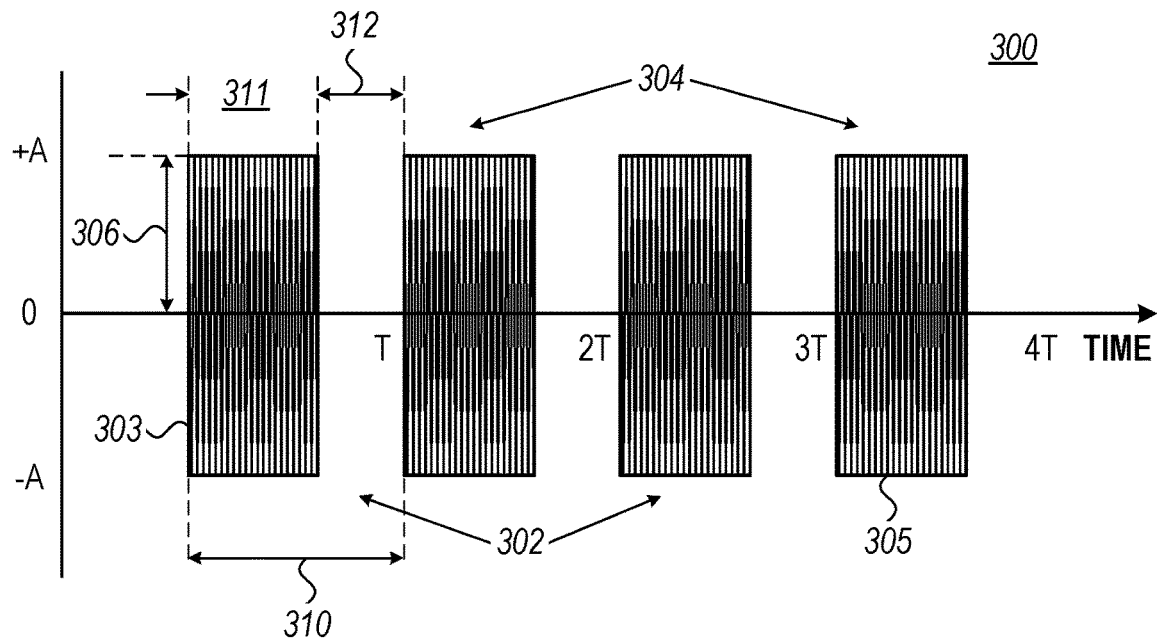
FIG. 3 is a graph of pulses of driving harmonic signals capable of generating bidirectional needle rotation, in accordance with an example of the disclosure.

In some examples of the disclosed technique, processor 38 adjusts the order of phases $\Phi_k$ between successive pulses of driving signals to bidirectionally rotate needle 16 to minimize vortices, as further described with respect to FIGS. 2 and 3.

Controller 55 may be realized in hardware or software, for example, in a proportional-integral-derivative (PID) control architecture. Controller 55 may comprise analog and/or digital circuits and interfaces enabling it to carry out the functions described herein.

In the shown example, probe 12 includes a sensor 27 coupled with irrigation channel 43*a*, and a sensor 23 coupled with aspiration channel 46*a*. Channels 43*a* and 46*a* are coupled respectively with irrigation line 43 and aspiration line 46. The sensor measurements (e.g., pressure, vacuum, and/or flow) are taken close to the proximal end of the handpiece where the irrigation outlet and the aspiration inlet are located, so as to provide processor 38 an accurate indication of the actual measurements occurring within an eye and to provide a short response time to a control loop comprised in processor 38.

As shown, during the phacoemulsification procedure, processor-controlled pump 24 comprised in a console 28 pumps irrigation fluid from an irrigation reservoir (not shown) via irrigation sleeve 56 to irrigate the eye. The fluid is pumped via irrigation tubing line 43 running from console 28 to probe 12. Using sensors (e.g., as indicated by sensors 23 and/or 27), processor 38 controls a pump rate of irrigation pump 24 to maintain intraocular pressure within prespecified limits.

Eye fluid and waste matter (e.g., emulsified parts of the cataract) are aspirated via hollow needle 16 to a collection receptacle (not shown) by a processor-controlled aspiration pump 26 also comprised in console 28 and using aspiration tubing line 46 running from probe 12 to console 28. In an example, processor 38 controls an aspiration rate of aspiration pump 26 to maintain intraocular pressure (in case of sub-pressure indicated, for example, by sensor 23) within prespecified limits.

In the shown example, processor 38 may receive user-based commands via a user interface 40, which may include setting a vibration mode, and setting or adjusting an irrigation and/or aspiration rate of the irrigation pump 24 and aspiration pump 26. Processor 38 may receive user-based commands via a user interface 40, which may include needle 16 stroke amplitude settings and turning on irrigation and/or aspiration.

In an example, the physician uses a foot pedal (not shown) as a means of control. For example, pedal position one activates only irrigation, pedal position two activates both irrigation and aspiration, and pedal position three adds needle 16 vibration. Additionally, or alternatively, processor 38 may receive user-based commands from controls located in a handle 21 of probe 12.

In an example, user interface 40 and display 36 may be integrated into a touch screen graphical user interface.

Some or all of the functions of processor 38 may be combined in a single physical component or, alternatively, implemented using multiple physical components. These physical components may comprise hard-wired or programmable devices, or a combination of the two. In some examples, at least some of the functions of processor 38 may be carried out by suitable software stored in a memory 35 (as shown in FIG. 1). This software may be downloaded to a device in electronic form, over a network, for example. Alternatively, or additionally, the software may be stored in tangible, non-transitory computer-readable storage media, such as optical, magnetic, or electronic memory. In particular, processor 38 runs a dedicated algorithm as disclosed herein, including in FIG. 4, that enables processor 38 to perform the disclosed steps, as further described below.

The system shown in FIG. 1 may include further elements which are omitted for clarity of presentation. For example, physician 15 typically performs the procedure using a stereo microscope or magnifying glasses, neither of which are shown. Physician 15 may use other surgical tools in addition to probe 12, which are also not shown in order to maintain clarity and simplicity of presentation.#

Vortex-Free Circular Motion of a Phacoemulsification Tip

FIG. 2 is a schematic, pictorial view of the phacoemulsification handpiece 12 of FIG. 1 with two options (A and B) (seen in inset 205) of a multi-crystal layout capable of inducing bidirectional rotation of needle 16, in accordance with an example of the disclosure.

As seen, needle 16 comprised in a distal end assembly 112 of handpiece 12 may be rotated bidirectionally along circular trajectory 50 within an X-Y plane. At a same time, needle 16 can be vibrated along a longitudinal axis Z, with a linear vibration amplitude 202.

Two multi-crystal options capable of driving needle 16 rotation are given in inset 205. Option A comprises a multi-crystal (e.g., multi-crystal 18 of FIG. 1) that is made of three piezoelectric crystals (218*a*, 218*b*, 218*c*) shaped as angular segments and attached (e.g., glued) one to the other. Angular crystal section elements (218*a*, 218*b*, 218*c*) have respective angular section electrodes (228*a*, 228*b*, 228*c*) disposed thereon and a common ground electrode 228*g*. Also shown are respective electrical leads (238*a*, 238*b*, 238*c*) for driving the different angular section electrodes.

For Option A, a transducer made of three 120° piezo crystal angular segments, needle rotation along one direction is achieved by driving the three piezoelectric crystals (218*a*, 218*b*, 218*c*) with harmonic signals having respective phases, such as 0°, 120°, and 240°. Needle rotation along the opposite direction is achieved by driving the three piezoelectric crystals (218*a*, 218*b*, 218*c*) with harmonic signals having respective phases, such as 240°, 120°, and 0°. In the present context, the term "harmonic signal" means a wave or signal made of frequencies that are each an integral (whole number) multiple of the frequency of the same reference signal or wave. In the examples described herein, the harmonic signals are typically sinusoidal, however using other waveforms, such as square waveforms, triangular waveforms, and so on, is covered as well.

Option B comprises a multi-crystal that is made of four piezoelectric crystals (258*a*, 258*b*, 258*c*, 258*d*) shaped as quadrant angular segments and attached (e.g., glued) one to the other. Angular crystal section elements (258*a*, 258*b*, 258*c*, 258*d*) have respective angular section electrodes (268*a*, 268*b*, 268*c*, 268*d*) disposed thereon and a common ground electrode 268*g*. Also shown are respective electrical leads (278*a*, 278*b*, 278*c*, 278*d*) for driving the different angular section electrodes. Also shown are respective electrical leads (278*a*, 278*b*, 278*c*, 278*d*) for driving the different angular section electrodes.

For Option B, i.e., a transducer made of four 90° piezo crystal angular segments, needle rotation along one direction is achieved by driving the two pairs of piezoelectric crystals (258*a*, 258*c*) and (258*b*, 258*d*) with harmonic signals having respective phases, such as 0° and 90°. Needle rotation along the opposite direction is achieved by driving the two pairs of piezoelectric crystals, (258*a*, 258*c*) and (258*b*, 258*d*), with harmonic signals having respective phases, such as 90° and 0°.

FIG. 3 is a graph 300 of pulses (302, 304) of driving respective harmonic signals (303, 305) capable of generating bidirectional rotation of needle 16, in accordance with an example of the disclosure. FIG. 3 is applicable to both Option A and Option B of multi-crystal 18 layout shown in FIG. 2, with a necessary selection made of signal routing and phase differences, as described with respect to FIG. 2.

Namely, the groups of harmonic signals 303 and 305 have a reversed phase order, so as to drive the needle bidirectionally, as described above.

FIG. 3 shows a train of pulses of harmonic signals, where each pulse has a duration 311 and a zero-signal pause duration 312, so that the sum of durations 311 and 312 is the periodicity T 310 of the pulse trains. In FIG. 3, first and second time intervals (e.g., of respective durations 311 and 304 of trains of pulses 302 and 304) are depicted the same but in some examples the first and second time intervals may vary and be different from one another.

Typically, pause duration 312 falls in the range of 0-10 ms, preferably at least 2 ms, and a typical zero-signal (or very low signal) duration 312 can last up to 2 ms. An amplitude 306 of the pulses affects the diameter of rotation trajectory with typical circular diameters falling in the range of 40 to 100 microns. The longitudinal vibration may still occur during pause durations 312, being driven independently of the rotations.

Figure 4:
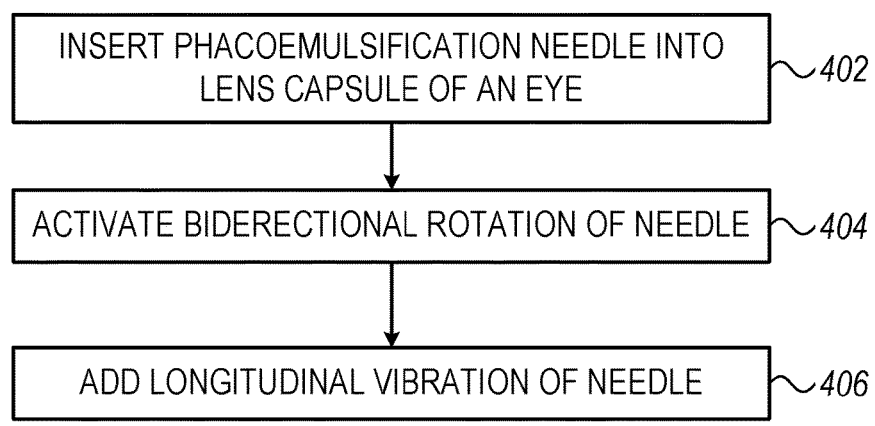
FIG. 4 is a flow chart schematically describing a method of phacoemulsification using bidirectional needle rotation, in accordance with an example of the disclosure.

FIG. 4 is a flow chart schematically describing a method of phacoemulsification using bidirectional rotation of needle 16, in accordance with an example of the disclosure. The algorithm, according to the presented example, carries out a process that begins with physician 15 inserting needle 16 into a lens capsule 17 of an eye of a patient, as seen in FIG. 1, at a needle insertion step 402.

Next, physician 15 activates a phacoemulsification mode of needle 16 that comprises bidirectional rotation of the needle, at a bidirectional needle rotation activation step 404.

At a linear vibration step 406, physician 15 may optionally add longitudinal vibration, for example by selecting a different protocol. In other examples steps 404 and 406 are combined into a single step of selecting an emulsification protocol comprising needle rotation and vibration.

Now the physician performs the lens emulsification by moving needle 16 inside lens 17 to rapidly emulsify the lens using the disclosed protocol while aspiring emulsified lens particles.

The example flow chart shown in FIG. 4 is chosen purely for the sake of conceptual clarity. In alternative examples, additional steps may be included, such as temperature measurement.

Rotation by Driving 3 Independent Signals with Different Phases

Figure 5A:
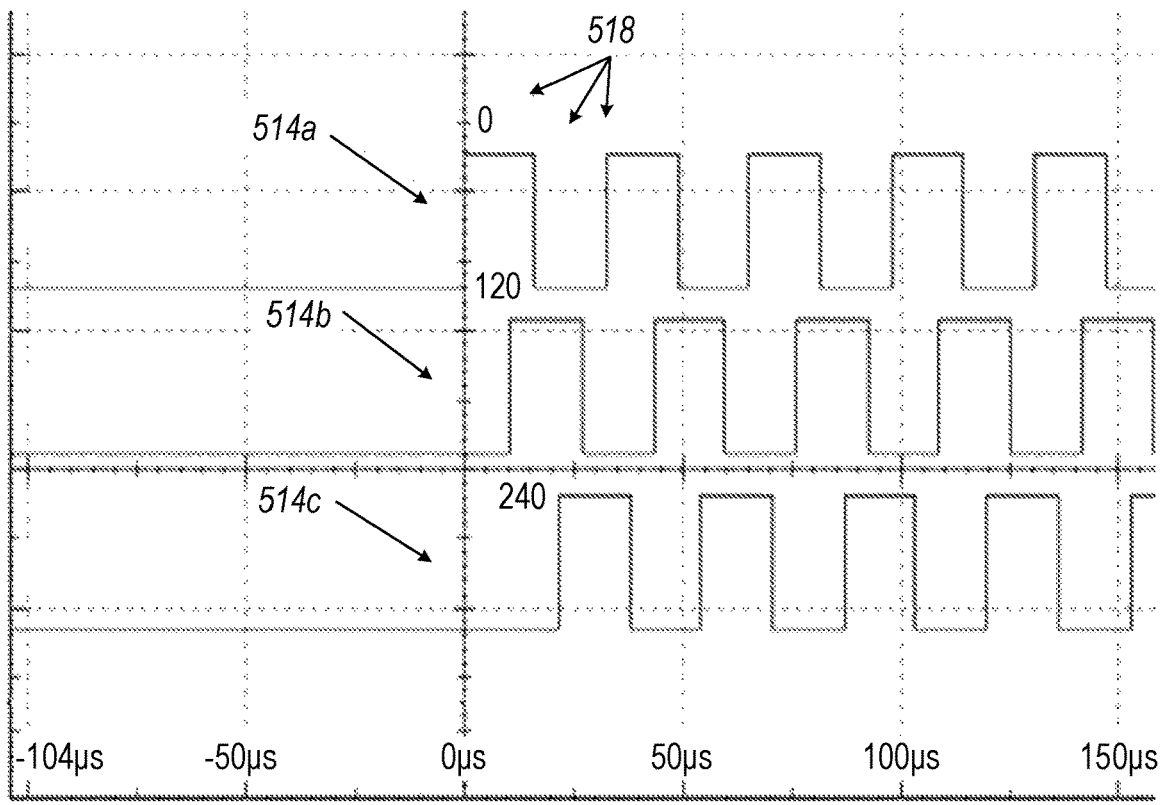
FIGS. 5A and 5B are graphs of pulse trains having relative phases of 0, 120 and 240 degrees and 0, −120 and −240 degrees, respectively, applied to the multi-crystal of FIG. 1, to generate bidirectional rotation of a tip, in accordance with an example of the disclosure.
Figure 5B:
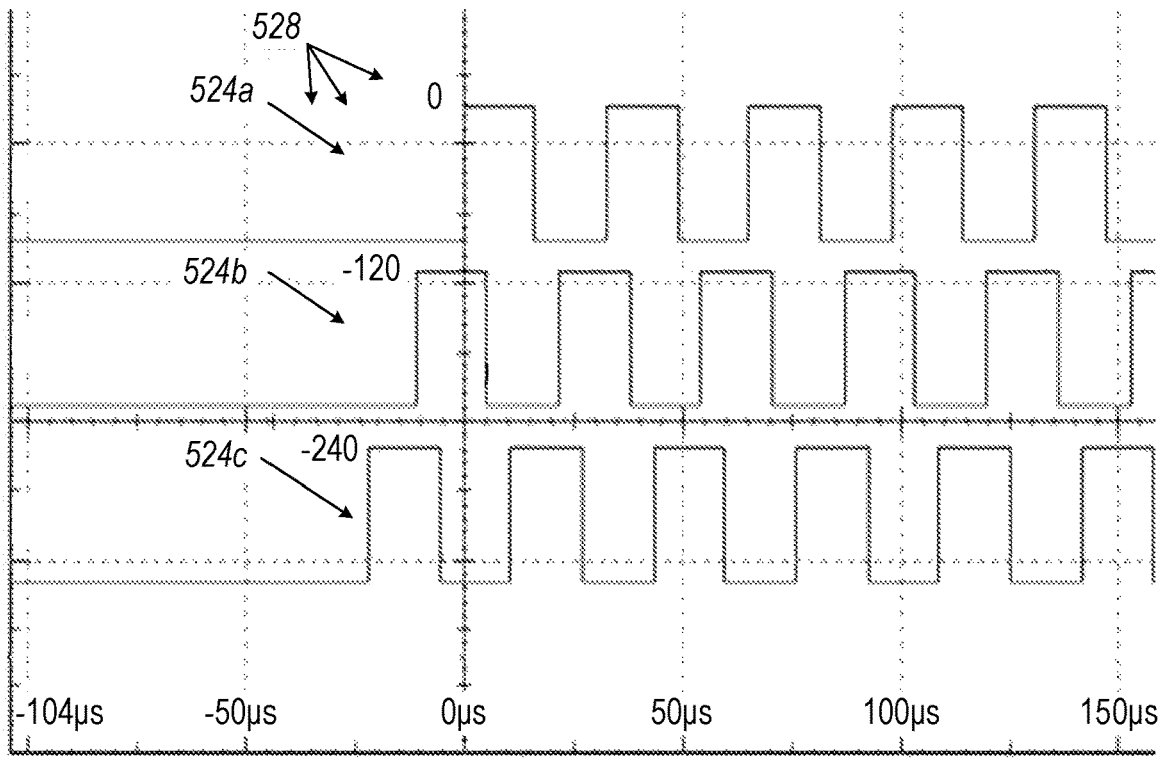

FIGS. 5A and 5B are graphs of pulse trains having relative phases of 0, 120 and 240 degrees (518) and relative phases 528 of 0, −120 and −240 degrees (528), respectively, applied to multi-crystal 18 of FIG. 1 to generating bidirectional rotation of a tip, in accordance with an example of the disclosure.

FIGS. 5A and 5B show the three digital driving signals (514*a*, 514*b*, 514*c*) and (524*a*, 524*b*, 524*c*), respectively, before filtering to sine waves and amplification. As seen, the phases are changed between FIG. 5A and FIG. 5B, to change a rotation direction.

EXAMPLES

Example 1

A method for operating a medical probe (12), the method including driving a tip (16, 56) of the medical probe to cause rotation of the tip (i) in a clockwise trajectory (50) in a plane perpendicular to a longitudinal axis during first time intervals (311), and (ii) in a counterclockwise trajectory in the plane during second time intervals (312) that are interleaved with the first time intervals (311).

Example 2

The method according to example 1, and comprising driving the tip (16, 56) to vibrate (202) along the longitudinal axis of the probe (12) concurrently with rotation of the tip.

Example 3

The method according to any of examples 1 and 2, wherein rotation of the tip (16, 56) comprises performing multiple repetitions of the clockwise trajectory (50) during each of the first time intervals (311), and multiple repetitions of the counterclockwise trajectory during each of the second time intervals (312).

Example 4

The method according to any of examples 1 through 3, wherein the driving of the tip comprises applying harmonic signals to respective angular segments (218*a*, 218*b*, 218*c*), (258*a*, 258*b*, 258*c*, 258*d*) of a multi-crystal coupled with the tip of the medical probe, so as to cause the tip to rotate along the clockwise or counterclockwise trajectory.

Example 5

The method according to any of examples 1 through 4, wherein applying the harmonic signals comprises adjusting phases of the harmonic signals so as to switch between the clockwise trajectory and the counterclockwise trajectory.

Example 6

The method according to any of examples 1 through 5, wherein adjusting the phases of the harmonic signals comprising reversing an order of the applied harmonic signals between the angular segments of the multi-crystal.

Example 7

The method according to any of examples 1 through 6, wherein the multi-crystal comprises three angular segments (218*a*, 218*b*, 218*c*), and wherein the phases of respective harmonic signals differ by 120° from one another.

Example 8

The method according to any of examples 1 through 6, wherein the multi-crystal comprises four angular segments (258*a*, 258*b*, 258*c*, 258*d*), and wherein the phases of respective harmonic signals differ by 90° between pairs of the angular segments.

Example 9

The method according to any of examples 1 through 8, wherein rotation of the tip comprises selecting a duty cycle of the first and second time intervals.

Example 10

The method according to any of examples 1 through 9, wherein rotation of the tip comprises selecting a duration of (311, 312) the first and second time intervals.

Example 11

The method according to any of examples 1 through 10, wherein the clockwise trajectory and the counterclockwise trajectory are circular.

Example 12

The method according to any of examples 1 through 11, wherein the tip is a needle of a phacoemulsification probe, and wherein the needle is inserted into a lens capsule (18) of an eye (20) and is vibrated and rotated so as to emulsify a lens.

Example 13

A system (10) for operating a medical probe (12) includes a multi-crystal (18) and a processor (38). The multi-crystal is configured to receive driving signals (114) and using the driving signals, drive a tip (16, 56) of the medical probe to cause rotation of the tip. The processor is configured to adjust the driving signals to cause rotation (i) in a clockwise trajectory (50) in a plane perpendicular to a longitudinal axis during first time intervals (311), and (ii) in a counterclockwise trajectory in the plane during second time intervals (312) that are interleaved with the first time intervals (311).

Example 14

The system according to Example 13, and comprising driving the tip (16, 56) to vibrate (202) along the longitudinal axis of the probe (12) concurrently with rotation of the tip.

Example 15

The system according to any of examples 13 and 14, wherein rotation of the tip (16, 56) comprises performing multiple repetitions of the clockwise trajectory (50) during each of the first time intervals (311), and multiple repetitions of the counterclockwise trajectory during each of the second time intervals (312).

Example 16

The system according to any of examples 13 through 15, wherein the driving of the tip comprises applying harmonic signals to respective angular segments (218*a*, 218*b*, 218*c*), (258*a*, 258*b*, 258*c*, 258*d*) of a multi-crystal coupled with the tip of the medical probe, so as to cause the tip to rotate along the clockwise or counterclockwise trajectory.

Example 17

The system according to any of examples 13 through 16, wherein applying the harmonic signals comprises adjusting phases of the harmonic signals so as to switch between the clockwise trajectory and the counterclockwise trajectory.

Example 18

The method according to any of examples 13 through 17, wherein adjusting the phases of the harmonic signals comprising reversing an order of the applied harmonic signals between the angular segments of the multi-crystal.

Example 19

The method according to any of examples 13 through 18, wherein the multi-crystal comprises three angular segments (218*a*, 218*b*, 218*c*), and wherein the phases of respective harmonic signals differ by 120° from one another.

Example 20

The system according to any of examples 13 through 18, wherein the multi-crystal comprises four angular segments (258*a*, 258*b*, 258*c*, 258*d*), and wherein the phases of respective harmonic signals differ by 90° between pairs of the angular segments.

Example 21

The system according to any of examples 13 through 20, wherein rotation of the tip comprises selecting a duty cycle of the first and second time intervals.

Example 22

The system according to any of examples 13 through 21, wherein rotation of the tip comprises selecting a duration of (311, 312) the first and second time intervals.

Example 23

The system according to any of examples 13 through 22, wherein the clockwise trajectory and the counterclockwise trajectory are circular.

Example 24

The system according to any of examples 13 through 23, wherein the tip is a needle of a phacoemulsification probe, and wherein the needle is inserted into a lens capsule (18) of an eye (20) and is vibrated and rotated so as to emulsify a lens.

Although the examples described herein mainly address a phacoemulsification technique, the methods and systems described herein can also be used in other applications, such as with other types of electrical surgery tools.

It will thus be appreciated that the examples described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

The invention claimed is:

1. A method for operating a phacoemulsification medical probe, the method comprising: driving a tip of the phacoemulsification medical probe to cause rotation of the tip (i) in a clockwise circular trajectory in a plane perpendicular to a longitudinal axis during first time intervals, and (ii) in a counterclockwise circular trajectory in the plane during second time intervals that are interleaved with the first time intervals, wherein each of the clockwise circular trajectory and the counterclockwise circular trajectory is a unidirectional motion along a closed elliptical trajectory in the plane perpendicular to the longitudinal axis.

2. The method according to claim 1, further comprising driving the tip to vibrate back and forth along the longitudinal axis of the phacoemulsification medical probe concurrently with rotation of the tip.

3. The method according to claim 1, wherein rotation of the tip comprises performing multiple repetitions of the clockwise circular trajectory during each of the first time intervals, and multiple repetitions of the counterclockwise circular trajectory during each of the second time intervals.

4. The method according to claim 1, wherein the driving of the tip comprises applying harmonic signals to respective angular segments of a multi-crystal coupled with the tip of the phacoemulsification medical probe, so as to cause the tip to rotate along the clockwise or counterclockwise circular trajectory.

5. The method according to claim 4, wherein applying the harmonic signals comprises adjusting phases of the harmonic signals so as to switch between the clockwise circular trajectory and the counterclockwise circular trajectory.

6. The method according to claim 5, wherein adjusting the phases of the harmonic signals comprising reversing an order of the applied harmonic signals between the angular segments of the multi-crystal.

7. The method according to claim 5, wherein the multi-crystal comprises three angular segments, and wherein the phases of respective harmonic signals differ by 120° from one another.

8. The method according to claim 5, wherein the multi-crystal comprises four angular segments, and wherein the phases of respective harmonic signals differ by 90° between pairs of the angular segments.

9. The method according to claim 1, wherein rotation of the tip comprises selecting a duty cycle of the first and second time intervals.

10. The method according to claim 1, wherein rotation of the tip comprises selecting a duration of the first and second time intervals.

11. The method according to claim 1, wherein the tip is a needle of the phacoemulsification probe, and wherein the needle is inserted into a lens capsule of an eye and is vibrated and rotated so as to emulsify a lens.

12. A system for operating a phacoemulsification medical probe, the system comprising: a multi-crystal configured to receive driving signals and using the driving signals, drive a tip of the phacoemulsification medical probe to cause rotation of the tip; and a processor, configured to: adjust the driving signals to cause rotation (i) in a clockwise circular trajectory in a plane perpendicular to a longitudinal axis during first time intervals, and (ii) in a counterclockwise circular trajectory in the plane during second time intervals that are interleaved with the first time intervals, wherein each of the clockwise circular trajectory and the counterclockwise circular trajectory is a unidirectional motion along a closed elliptical trajectory in the plane perpendicular to the longitudinal axis.

13. The system according to claim 12, wherein the multi-crystal and the processor are further configured to drive the tip to vibrate back and forth along the longitudinal axis of the phacoemulsification medical probe concurrently with rotation of the tip.

14. The system according to claim 12, wherein rotation of the tip comprises performing multiple repetitions of the clockwise circular trajectory during each of the first time intervals, and multiple repetitions of the counterclockwise circular trajectory during each of the second time intervals.

15. The system according to claim 14, wherein the processor is configured to drive the tip by applying harmonic signals to respective angular segments of the multi-crystal coupled with the tip of the phacoemulsification medical probe, so as to cause the tip to rotate along the clockwise or counterclockwise circular trajectory.

16. The system according to claim 15, wherein the processor is configured to apply the harmonic signals by adjusting phases of the harmonic signals so as to switch between the clockwise circular trajectory and the counterclockwise circular trajectory.

17. The system according to claim 15, wherein the processor is configured to adjust the phases of the harmonic signals by reversing an order of the applied harmonic signals between the angular segments of the multi-crystal.

18. The system according to claim 15, wherein the multi-crystal comprises three angular segments, and wherein the phases of respective harmonic signals differ by 120° from one another.

19. The system according to claim 15, wherein the multi-crystal comprises four angular segments, and wherein the phases of respective harmonic signals differ by 90° between pairs of the angular segments.

20. The system according to claim 12, wherein rotation of the tip comprises the processor selecting a duty cycle of the first and second time intervals.

21. The system according to claim 12, wherein rotation of the tip comprises the processor selecting a duration of the first and second time intervals.

22. The system according to claim 12, wherein the tip is a needle of the phacoemulsification probe, and wherein the needle is configured to be inserted into a lens capsule of an eye and vibrated and rotated so as to emulsify a lens.

* * * * *